(12) United States Patent
Kitagawa et al.

(10) Patent No.: US 7,764,334 B2
(45) Date of Patent: Jul. 27, 2010

(54) ILLUMINATION APPARATUS COMPRISING A LIGHT GUIDE PLATE DIVIDED BY WEDGE-SHAPED GROOVES HAVING AN APEX ANGLE OF 15 DEGREES OR LESS AND A RATIO OF DEPTH TO THICKNESS IN A RANGE OF 0.4 TO 0.7

(75) Inventors: Toshitake Kitagawa, Kanagawa-ken (JP); Naotada Okada, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 209 days.

(21) Appl. No.: 11/771,591

(22) Filed: Jun. 29, 2007

(65) Prior Publication Data
US 2008/0030650 A1 Feb. 7, 2008

(30) Foreign Application Priority Data
Jun. 30, 2006 (JP) .............................. 2006-181238
Jun. 26, 2007 (JP) .............................. 2007-167434

(51) Int. Cl.
*G02F 1/1335* (2006.01)
*F21V 7/04* (2006.01)
*G09F 13/08* (2006.01)

(52) U.S. Cl. .................... 349/65; 362/612; 362/613; 362/616; 362/625; 362/626; 362/97.3; 349/69

(58) Field of Classification Search ................. 349/65; 362/613, 616, 619, 620, 612, 625, 626, 97.3
See application file for complete search history.

(56) References Cited

U.S. PATENT DOCUMENTS

| 5,584,556 | A  | * | 12/1996 | Yokoyama et al. | .......... 362/625 |
| 5,598,280 | A  | * | 1/1997 | Nishio et al. | ................... 349/57 |
| 2002/0033909 | A1 | * | 3/2002 | Hiyama et al. | ............... 349/65 |
| 2002/0101729 | A1 | * | 8/2002 | Hayashi et al. | ............... 362/84 |
| 2004/0012732 | A1 | * | 1/2004 | Sugiura | ........................ 349/65 |
| 2005/0140848 | A1 |   | 6/2005 | Yoo et al. | |
| 2005/0259441 | A1 | * | 11/2005 | Arai et al. | ................... 362/613 |
| 2006/0007702 | A1 | * | 1/2006 | Hsieh et al. | ................. 362/611 |

FOREIGN PATENT DOCUMENTS

JP 2001-210122 8/2001

* cited by examiner

*Primary Examiner*—Andrew Schechter
*Assistant Examiner*—Dennis Y Kim
(74) *Attorney, Agent, or Firm*—Oblon, Spivak, McClelland, Maier & Neustadt, L.L.P.

(57) ABSTRACT

An illumination apparatus includes: a light guide plate composed of a plurality of aligned blocks; and a plurality of light sources, each being provided for one of the blocks and emitting light to the one block. A gap of 0.1 microns or more is formed in at least part of a region between the adjacent blocks. An inside of the gap serves as an air layer.

16 Claims, 20 Drawing Sheets

ILLUMINATION APPARATUS COMPRISING A LIGHT GUIDE PLATE DIVIDED BY WEDGE-SHAPED GROOVES HAVING AN APEX ANGLE OF 15 DEGREES OR LESS AND A RATIO OF DEPTH TO THICKNESS IN A RANGE OF 0.4 TO 0.7

CROSS-REFERENCE TO RELATED APPLICATIONS

This application is based upon and claims the benefit of priorities from the prior Japanese Patent Application No. 2006-181238, filed on Jun. 30, 2006, and the prior Japanese Patent Application No. 2007-167434, filed on Jun. 26, 2007; the entire contents of which are incorporated herein by reference.

BACKGROUND OF THE INVENTION

1. Field of the Invention

This invention relates to an illumination apparatus and a liquid crystal display apparatus, and more particularly to an illumination apparatus for allowing light from a light source to be planarly emitted by a light guide plate and to a liquid crystal display apparatus of the pseudo-impulse type equipped with this illumination apparatus.

2. Background Art

Recently, liquid crystal display apparatuses (hereinafter also referred to as "LCDs") have been rapidly prevailing as thin display apparatuses. However, in comparison with CRT (cathode-ray tube) display apparatuses (hereinafter simply referred to as "CRTs"), LCDs suffer from blur of moving images and low contrast. That is, in CRTs, between the emission period of a pixel in a frame and the emission period of this pixel in the next frame, there is a non-emission period in which this pixel does not emit light, hence producing little afterimage. On the other hand, the display method of LCDs is of the "hold type" lacking such non-emission period. Hence afterimage occurs, and is perceived as blur of moving images by users. Furthermore, CRTs have high contrast because pixels do not emit light during black display. On the other hand, when an LCD displays black, the liquid crystal panel is turned into a light shielding state while the light source keeps emitting light. However, it is difficult to completely shield light even if the liquid crystal panel is turned into the light shielding state. Thus LCDs have low contrast.

To eliminate afterimage in LCDs, it is effective to insert a non-emission period for black display between one emission period and the next emission period for image display as in CRTs to provide a "pseudo-impulse type" display method. This can be realized by providing an emission period for image display and a non-emission period for black display within one frame. However, when a moving image is displayed at 60 Hz, one frame has a time span of 16.7 ms (milliseconds), whereas liquid crystal typically has a response time of 10 ms or more. Hence it is difficult to realize two displays, i.e., image display and black display, within one frame by controlling liquid crystal.

To solve this problem, in a proposed technique for a backlight type LCD using cold-cathode tubes as a light source, black display is inserted between image displays by successively turning out the cold-cathode tubes in synchronization with the timing of applying a video signal to the liquid crystal panel. Thus it is possible to realize pseudo-impulse type display, thereby preventing afterimage, enhancing contrast, and reducing power consumption.

On the other hand, small LCDs are often based on sidelight type LCDs for reducing thickness, where light from a light source is planarly emitted by a light guide plate. It is desirable to apply the above pseudo-impulse type display method also to such sidelight type LCDs. For example, in a technique proposed in JP 2001-210122A, a light guide plate is composed of a plurality of blocks, which are optically separated by reflection plates placed between the blocks, and a white LED (light emitting diode) is provided for each block. While a block emits light, other blocks adjacent to this block do not emit light. Thus pseudo-impulse type display can be realized.

Unfortunately, the technique disclosed in JP 2001-210122A needs work for providing reflection plates in the light guide plate, which increases cost. Furthermore, the reflection plates absorb light, and hence decreases the utilization efficiency of light.

SUMMARY OF THE INVENTION

According to an aspect of the invention, there is provided an illumination apparatus including: a light guide plate composed of a plurality of aligned blocks; and a plurality of light sources, each being provided for one of the blocks and emitting light to the one block, a gap of 0.1 microns or more being formed in at least part of a region between the adjacent blocks, and an inside of the gap serving as an air layer.

According to another aspect of the invention, there is provided a liquid crystal display apparatus including: the illumination apparatus; a liquid crystal panel irradiated with light from the illumination apparatus; and a controller for applying a video signal to the liquid crystal panel and successively turning on the light sources in synchronization with timing of the application, the illumination apparatus including: a light guide plate composed of a plurality of aligned blocks; and a plurality of light sources, each being provided for one of the blocks and emitting light to the one block, a gap of 0.1 microns or more being formed in at least part of a region between the adjacent blocks, and an inside of the gap serving as an air layer.

DETAILED DESCRIPTION OF THE INVENTION

Embodiments of the invention will now be described with reference to the drawings.

First, a first embodiment of the invention is described.

Figure 1:
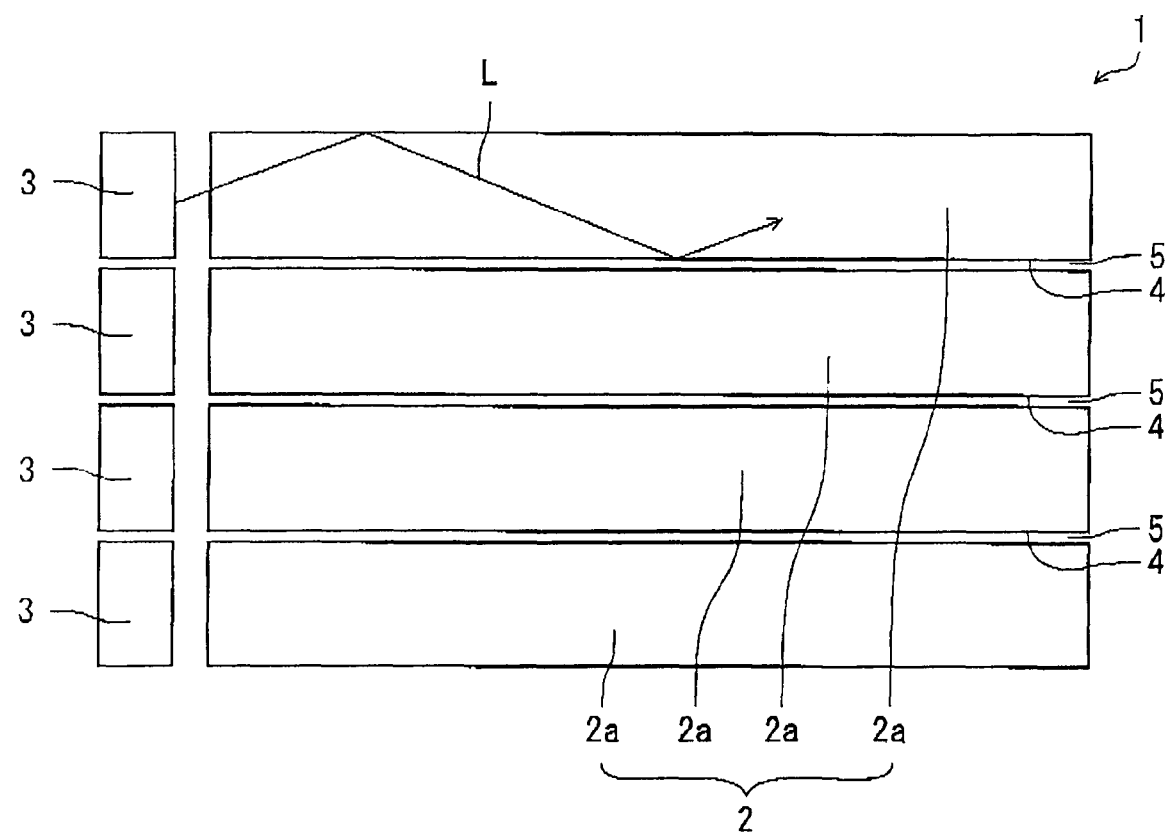
FIG. 1 is an optical model diagram illustrating an illumination apparatus according to a first embodiment of the invention.

FIG. 1 is an optical model diagram illustrating an illumination apparatus according to a first embodiment of the invention.

As shown in FIG. 1, the illumination apparatus 1 according to this embodiment includes a light guide plate 2 composed of a plurality of blocks 2a arranged in line, and a plurality of light sources 3 each provided for an associated block 2a for irradiation thereof. A gap 4 of 0.1 microns or more is formed in at least part of the region between adjacent blocks 2a, and the inside of the gap 4 serves as an air layer 5. A prism or pattern (not shown) for diffusing light is formed in at least one of the upper and lower face of the light guide plate 2.

In this embodiment, when one light source 3 emits light, the light enters one block 2a from an end face of the light guide plate 2, is totally reflected at the surface of the block 2a, that is, at the face constituting the side face of the light guide plate 2 or the interface between the block 2a and the air layer 5 and at the upper and lower face of the block 2a, and propagates in the block 2a away from the light source 3. In FIG. 1, the propagation path of the light is illustrated as an optical path L. In this propagation process, the light is scattered by the prism or pattern formed in the upper and/or lower face of the block 2a. The light that has resulted in violating the total reflection condition is emitted outward from the upper or lower face of the block 2a. In the block 2a, light can be uniformly emitted from the light guide plate 2 by increasing the formation density of the prism or pattern toward the downstream side of the light traveling direction. Thus light can be planarly emitted from the light guide plate 2.

Here, adjacent blocks 2a can be optically separated from each other by setting the width of the gap 4 to 0.1 microns or more. If the width of the gap 4 is larger than the wavelength of the emitted light of the light source 3, the blocks 2a can be optically separated from each other more reliably. In this case, the width of the gap 4 is preferably set to e.g. 1 micron or more. Furthermore, if the width of the gap 4 is 50 microns or more, the distance between the blocks 2a is provided with a certain tolerance, which facilitates assembling the light guide plate.

According to this embodiment, the light injected into the block 2a is totally reflected at the interface between the block 2a and the air layer 5, and hence does not enter another block 2a adjacent to this block 2a. Thus only a particular block 2a can be allowed to emit light by turning on a particular light source 3. Therefore, by successively turning on the light sources 3, the light guide plate 2 can successively emit light block by block, achieving segment lighting.

Furthermore, in this embodiment, the light guide plate 2 has no reflection plate between the blocks 2a. Hence the cost for fabricating the light guide plate 2 is reduced, and the cost of the illumination apparatus 1 is reduced. Moreover, there is no absorption of light by metal and the like forming a reflection plate. Hence high utilization efficiency of light is achieved.

In FIG. 1, by way of illustration, the light guide plate 2 is divided into four blocks 2a, and four light sources 3 are provided on one side of the light guide plate 2. However, this embodiment is not limited thereto. For example, a total of eight light sources 3 may be provided on both sides of the light guide plate 2, or the number of blocks 2a may be two, three, or five or more.

Next, a second embodiment of the invention is described.

Figure 2:
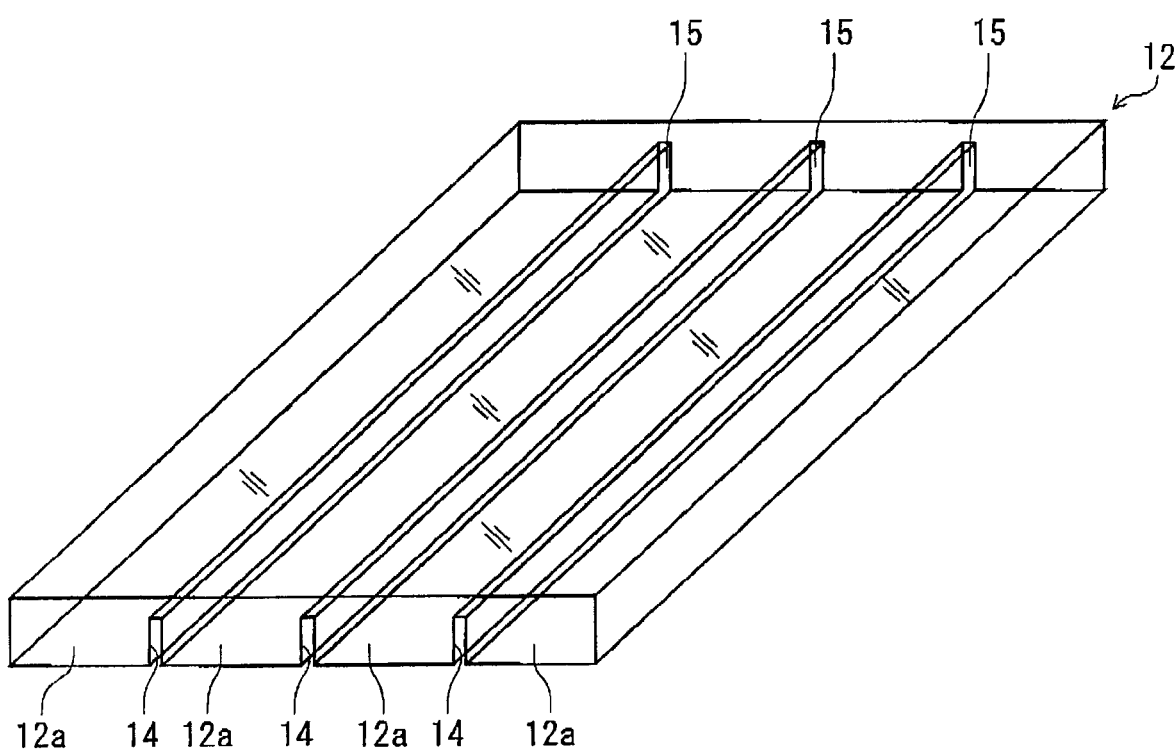
FIG. 2 is a perspective view illustrating a light guide plate of an illumination apparatus according to a second embodiment of the invention.

FIG. 2 is a perspective view illustrating a light guide plate of an illumination apparatus according to a second embodiment of the invention.

As shown in FIG. 2, the illumination apparatus according to this embodiment is different from the illumination apparatus 1 according to the first embodiment described above (see FIG. 1) in including a light guide plate 12 monolithically formed from transparent resin, for example, instead of the light guide plate 2 (see FIG. 1).

The light guide plate 12 has a plurality of grooves 14 formed longitudinally along the light guide plate 12 from its lower face side, and the inside of the groove 14 serves as an air layer 15. The light guide plate 12 is divided into a plurality of blocks 12a by the grooves 14. However, the blocks 12a are not completely separated from each other, but linked with each other in the upper portion of the light guide plate 12. That is, the groove 14 is a gap formed partially in the region between adjacent blocks 12a. The groove 14 has a width of 0.1 microns or more. Thus the adjacent blocks 12a are locally, optically coupled with each other. The configuration of this embodiment other than the foregoing is the same as that of the first embodiment described above.

In this embodiment, when the light injected from the light source 3 (see FIG. 1) into the block 12a reaches the side face of the block 12a, the light incident on the interface with the air layer 15 is totally reflected, but the light incident on the upper portion (linking portion) of the light guide plate 12 enters an adjacent block 12a through this upper portion. Thus part of the light injected into a block 12a from the light source 3 is leaked into an adjacent block 12a. As a result, as viewed from the light emitting surface side of the illumination apparatus, the outer edge of the light emission region can be blurred.

Thus, even if any variation in the amount of light emission of the light sources 3 causes variation in the amount of light emission between the blocks 12a, this variation can be obscured. The operation and effect of this embodiment other than the foregoing are the same as those of the first embodiment described above.

Next, a third embodiment of the invention is described.

Figure 3:
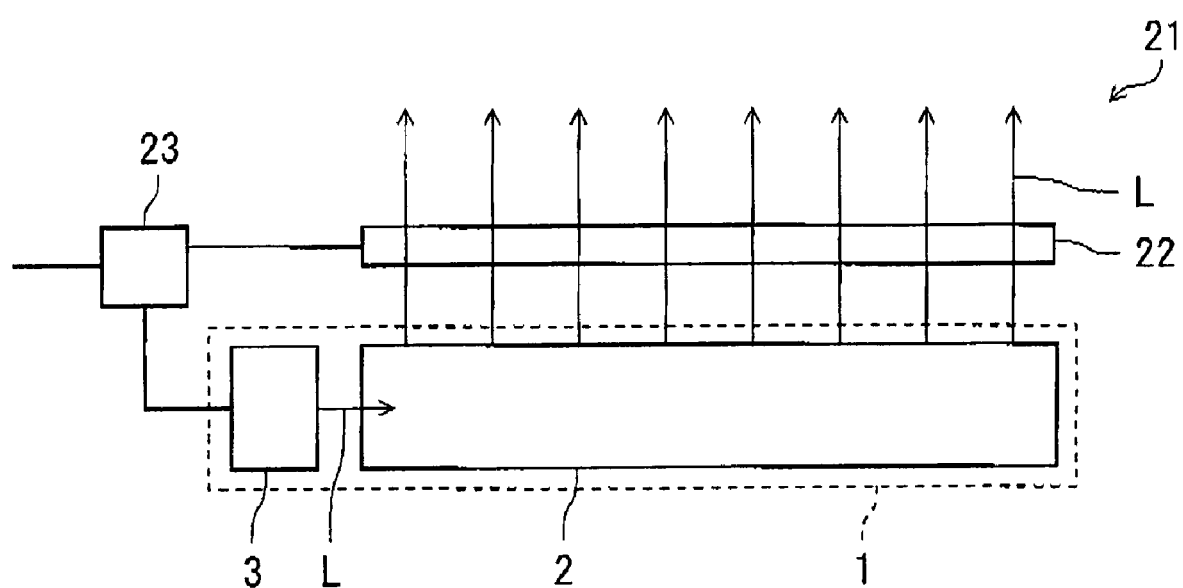
FIG. 3 is a block diagram illustrating a liquid crystal display apparatus according to a third embodiment of the invention.

FIG. 3 is a block diagram illustrating a liquid crystal display apparatus according to a third embodiment of the invention.

As shown in FIG. 3, the liquid crystal display apparatus 21 according to this embodiment includes an illumination apparatus 1 according to the first embodiment described above, and a liquid crystal panel 22 on the light emitting surface side of this illumination apparatus 1. Thus the liquid crystal panel 22 is irradiated with planar light from the illumination apparatus 1. The liquid crystal display apparatus 21 also includes a controller 23 for applying a video signal to the liquid crystal panel 22 and successively turning on the light sources 3 of the illumination apparatus 1 in synchronization with this application timing.

In this embodiment, the controller 23 applies a video signal to the liquid crystal panel 22 and successively turns on the light sources 3 in synchronization with this application timing. Thus each pixel of the liquid crystal panel 22 can be provided with an emission period and a non-emission period within one frame, and image display can be alternated with black display. That is, pseudo-impulse type display can be realized. As a result, afterimage can be reduced to eliminate blur of moving images. Furthermore, because the light source 3 is turned out during black display, it is possible to enhance image contrast and to reduce power consumption. Moreover, the light guide plate 2 has no reflection plates. Hence it is possible to reduce the cost of the liquid crystal display apparatus 21 and to enhance the utilization efficiency of light.

The liquid crystal display apparatus 21 according to this embodiment can be suitably used as a television receiver, for example. It has a wide dynamic range because of high contrast, and suffers from little blur of moving images because of little afterimage. Thus, overall, it is possible to provide high image quality and sharp display. Furthermore, because the illumination apparatus 1 of the side light type can be used as a backlight, the thickness of the liquid crystal display apparatus 21 can be decreased to e.g. 20 millimeters or less. As a result, the liquid crystal display apparatus 21 can be suitably used as a small display apparatus of e.g. 20 inches or less.

In this embodiment, the illumination apparatus 1 may be replaced by the illumination apparatus according to the second embodiment described above. Then, even if the amount of light emission of the light sources 3 vary due to temperature change and aging degradation and results in varied screen brightness between the regions of the liquid crystal display apparatus 21, unevenness can be obscured because the boundary between the regions can be blurred.

Next, a fourth embodiment of the invention is described.

Figure 4:
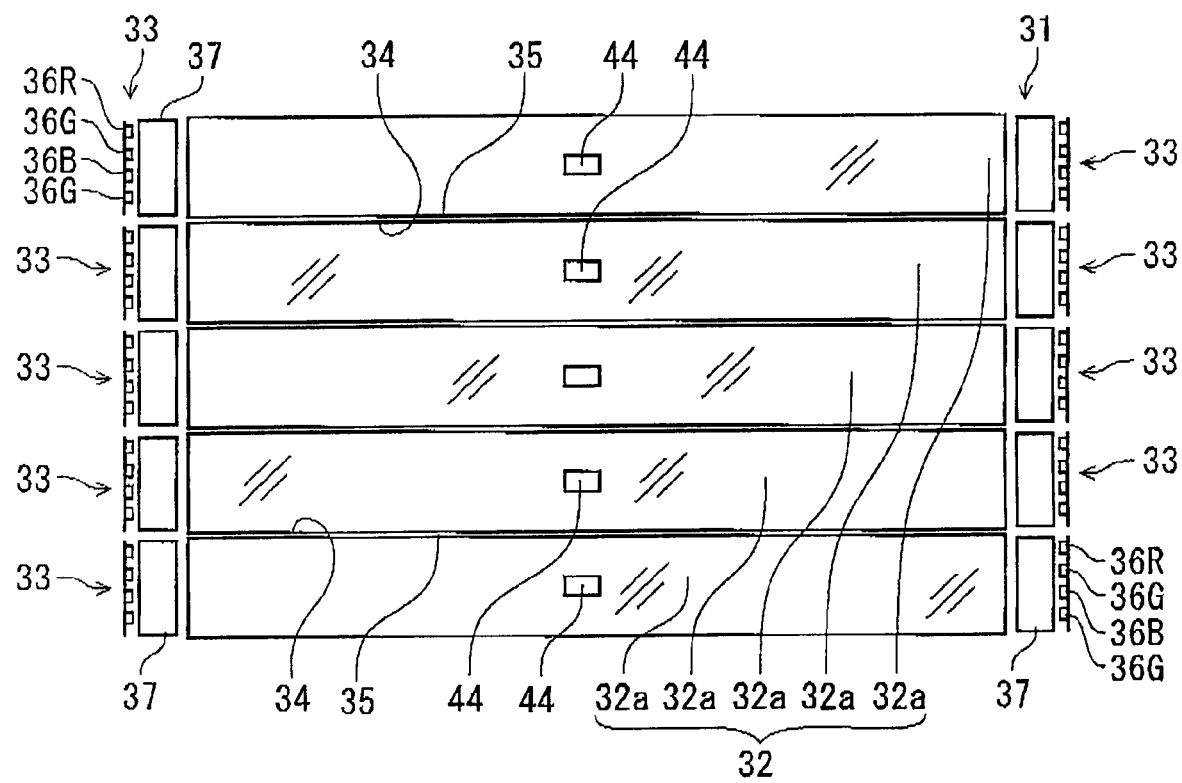
FIG. 4 is a plan view illustrating an illumination apparatus of a liquid crystal display apparatus according to a fourth embodiment of the invention.

FIG. 4 is a plan view illustrating an illumination apparatus of a liquid crystal display apparatus according to a fourth embodiment of the invention.

Figure 5:
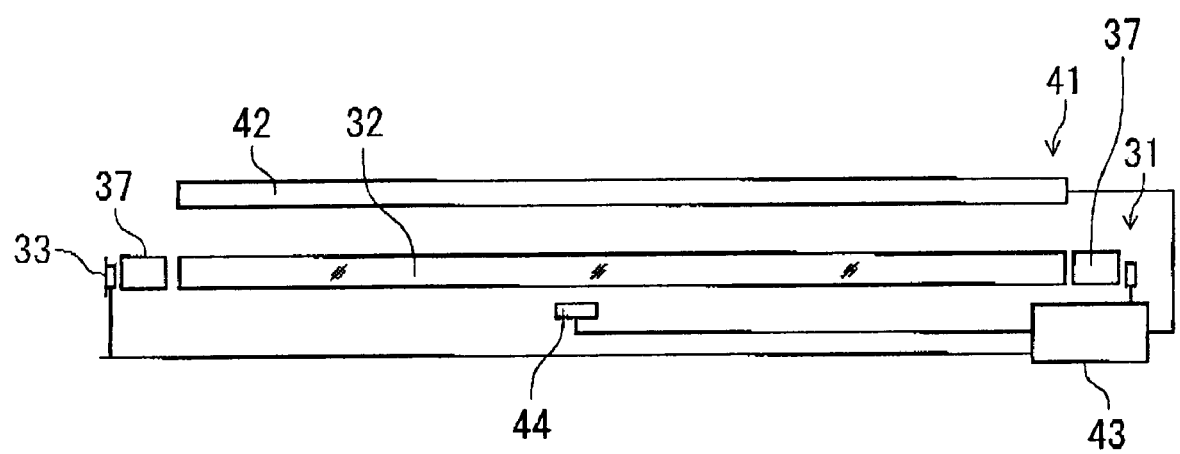
FIG. 5 is a side view schematically illustrating the liquid crystal display apparatus according to the fourth embodiment.

FIG. 5 is a side view schematically illustrating the liquid crystal display apparatus according to the fourth embodiment.

As shown in FIG. 5, the liquid crystal display apparatus 41 according to this embodiment includes an illumination apparatus 31, and a liquid crystal panel 42 on the light emitting surface side of this illumination apparatus 31.

As shown in FIG. 4, the illumination apparatus 31 includes a light guide plate 32, which is divided into a plurality of blocks 32a. A gap 34 of 0.1 microns or more is formed between adjacent blocks 32a, and the inside of the gap 34 serves as an air layer 35. The width of each block 32a is illustratively 25 millimeters.

Light sources 33 are provided for each block 32a on both sides of the light guide plate 32. Each light source 33 has a red LED (light emitting diode) 36R for emitting red light, green LEDs 36G for emitting green light, and a blue LED 36B for emitting blue light. Each LED is shaped like a square measuring e.g. 3.5 millimeters on a side as viewed from the light emitting direction, and the LEDs are mounted at a pitch of e.g. 4.5 millimeters in each light source 33.

Between the block 32a and its associated light source 33, a color mixing member 37 intervenes in the optical path between the light source 33 and the light guide plate 32. The color mixing member 37 mixes red light emitted from the red LED 36R, green light emitted from the green LED 36G, and blue light emitted from the blue LED 36B.

Furthermore, below each block 32a is provided a light receiver 44 for detecting the intensity of light emitted downward from the block 32a. The liquid crystal display apparatus 41 also includes a controller 43 for applying a video signal to the liquid crystal panel 42, turning on the light sources 33 in synchronization with this application timing, and controlling the output of the light source 33 on the basis of the detection result of the light receiver 44.

In this embodiment, the light source 33 has a red LED 36R, green LEDs 36G, and a blue LED 36B. Hence image display with higher color reproducibility is achieved than in the case of using white LEDs. Furthermore, the color mixing member 37 provided between the light source 33 and the light guide plate 32 allows color mixing to be performed in a shorter distance than in the case of color mixing of light using the end portion of the light guide plate 32. As a result, the liquid crystal display apparatus 41 can be downsized.

Furthermore, in this embodiment, the light receiver 44 detects the amount of light emission for each block 32a, and the controller 43 performs feedback control on the output of the light source 33 on the basis of the detection result of the light receiver 44. Hence any variation in the output characteristics of each LED constituting the light source 33 can be compensated for. Thus image display free from unevenness can be achieved. The operation and effect of this embodiment other than the foregoing are the same as those of the third embodiment described above.

In the following, examples for implementing the above embodiments are described, beginning with a first example, which instantiates the first embodiment (see FIG. 1) described above.

Figure 6:
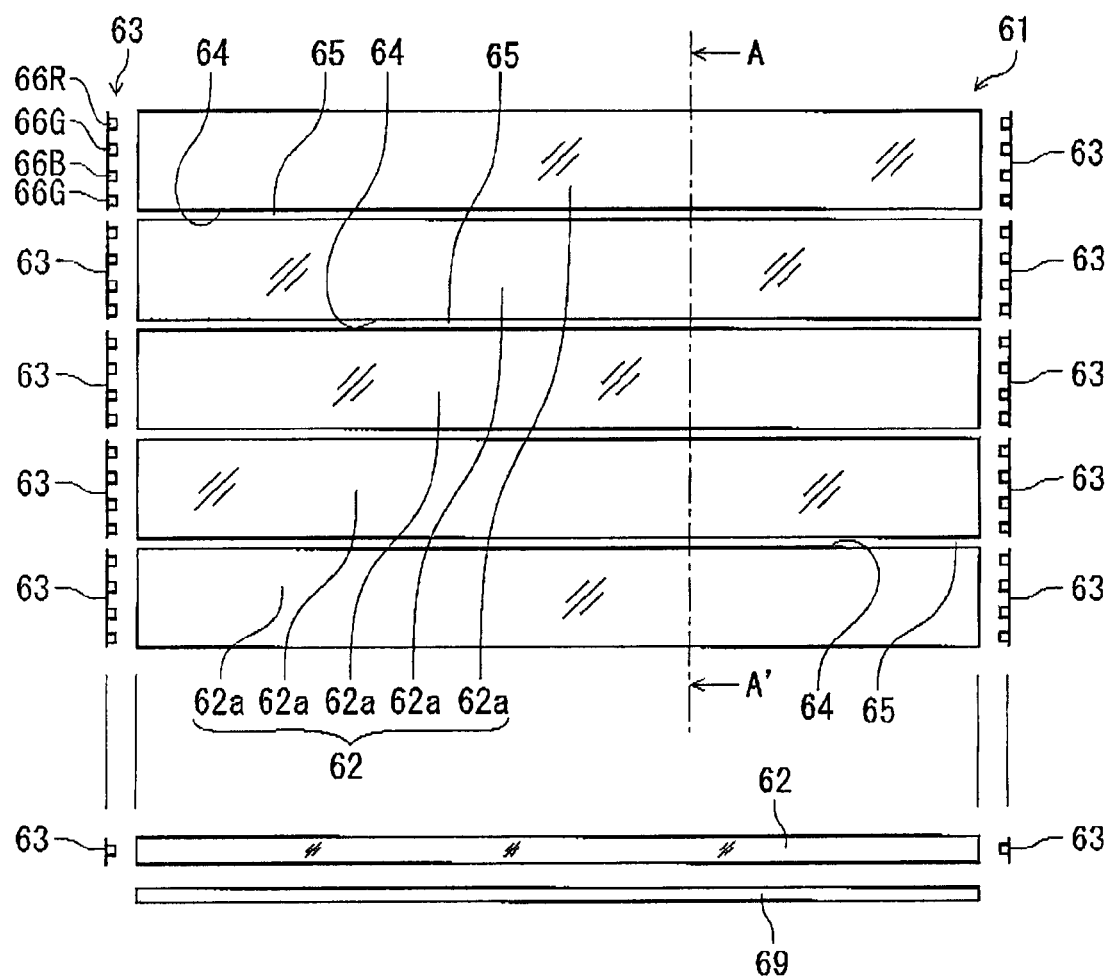
FIG. 6 shows a plan view and a side view illustrating an illumination apparatus according to a first example.

FIG. 6 shows a plan view and a side view illustrating an illumination apparatus according to a first example.

Figure 7:
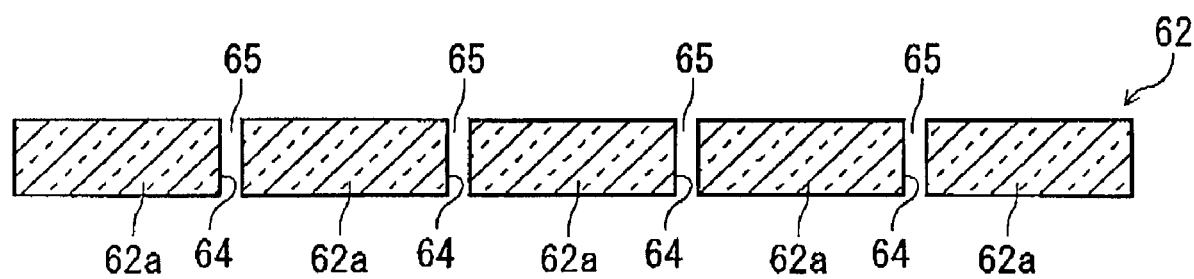
FIG. 7 is a cross-sectional view taken along line A-A' of FIG. 6 illustrating the light guide plate in the first example.

FIG. 7 is a cross-sectional view taken along line A-A' of FIG. 6 illustrating the light guide plate in the first example.

As shown in FIG. 6, the illumination apparatus 61 according to this example includes a light guide plate 62 made of transparent resin such as acrylic resin, and a plurality of light sources 63 are provided on both sides of the light guide plate 62. Furthermore, a reflection sheet 69 is provided below the light guide plate 62. The reflection sheet 69 allows the light emitted downward from the light guide plate 62 to be reflected upward, and is illustratively made of a resin sheet coated with metal film.

As shown in FIGS. 6 and 7, the light guide plate 62 is divided into a plurality of, e.g. five, strip-shaped blocks 62a. The blocks 62a are aligned along their widthwise direction. The five blocks 62a are separate from each other, and a gap 64 of 0.1 microns or more, specifically 50 microns or more, is provided between adjacent blocks 62a, and the inside of the gap 64 serves as an air layer 65. A prism or pattern (not shown) for diffusing light is formed in at least one of the upper and lower face of the light guide plate 62.

Light sources 63 are provided for each block 62a. That is, a pair of light sources 63 is provided at the longitudinally opposite ends of each block 62a. These light sources 63 emit light almost exclusively to the associated block 62a. Each light source 63 has one red LED 66R, two green LEDs 66G, and one blue LED 66B on a common substrate.

Next, the operation of this example is described.

First, the LEDs in a pair of light sources 63 placed on both sides of one block 62a are turned on. Thus these light sources 63 emit red, green, and blue light, which enter the block 62a through both end faces thereof. This light is totally reflected at the side face of the block 62a, that is, at the face constituting the side face of the light guide plate 62 and the interface between the block 62a and the air layer 65 and at the upper and lower face of the block 62a, and propagates in the block 62a. Here the red, green, and blue light undergo color mixing to form white light at the longitudinally opposite end portions of the block 62a. In this propagation process, the light is scattered by the prism or pattern formed in the upper or lower face of the block 62a.

The light incident on the upper or lower face of the block 62a at an angle that does not satisfy the total reflection condition is not reflected at the upper or lower face, but emitted outside with refraction. The light emitted from the lower face of the block 62a travels downward, is reflected upward from the reflection sheet 69, and is returned again into the light guide plate 62. On the other hand, the light emitted from the upper face of the block 62a is emitted upward from the illumination apparatus 61. Here the density distribution of the prism or pattern formed in the upper or lower face of the block 62a can be adjusted so that uniform planar light can be emitted from the upper face of the block 62a.

Next, the effect of this example is described.

In this example, the light guide plate 62 is divided into a plurality of blocks 62a, and a gap 64 of 0.1 microns or more is formed between adjacent blocks 62a to serve as an air layer 65. Thus light is totally reflected at the interface between the block 62a and the air layer 65, and hence the blocks 62a are optically independent of each other. On the other hand, the light emitted from a pair of light sources 63 placed on both sides of any block 62a is caused to be incident only on this block 62a. Hence a plurality of blocks 62a can be independently caused to emit light by independently controlling the light sources 63. Thus segment lighting is achieved by successively turning on the light sources 63.

Furthermore, in this example, the light guide plate 62 has no reflection plate. Hence the light guide plate 62 can be easily fabricated at low cost. Thus the cost of the illumination apparatus 61 can be reduced. Moreover, there is no absorption of light by metal and the like forming a reflection plate, achieving high utilization efficiency of light. Furthermore, the illumination apparatus 61 according to this example achieves high color reproducibility because the light source 63 has a red LED 66R, green LEDs 66G, and a blue LED 66B.

Next, a variation of the first example is described.

Figure 8:
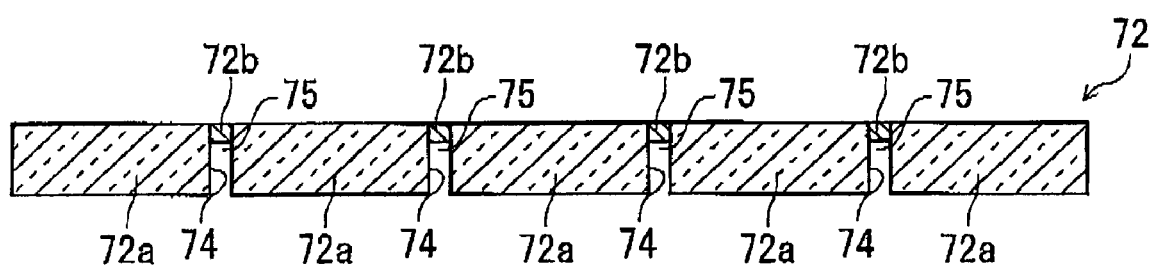
FIG. 8 is a cross-sectional view showing a light guide plate in a variation of the first example.

FIG. 8 is a cross-sectional view showing a light guide plate in a variation of the first example.

Here, the cross-sectional view of FIG. 8 corresponds to FIG. 7 in the first example described above. That is, it corresponds to the cross-sectional view taken along line A-A' of FIG. 6.

The illumination apparatus according to this variation is different from the illumination apparatus according to the first example described above in the configuration of the light guide plate. More specifically, as shown in FIG. 8, the light guide plate 72 of this variation has a plurality of, e.g. five, blocks 72a separate from each other, and a spacer 72b having a thickness of 0.1 microns or more, specifically 50 microns or more, is placed between the blocks 72a. Thus the five blocks 72a are assembled into one light guide plate 72 using the spacers 72b. The spacer 72b allows a gap 74 of 0.1 microns or more, specifically 50 microns or more, to be provided between the blocks 72a, and the inside of the gap 74 serves as an air layer 75. The material of the spacer 72b is not particularly limited, but may be any material such as resin or metal as long as it has certain rigidity. The configuration of this variation other than the foregoing is the same as that of the first example described above.

According to this variation, the light guide plate 72 can be assembled easily and accurately because the spacer 72b is provided between the blocks 72a. The operation and effect of this variation other than the foregoing are the same as those of the first example described above.

Next, a description is given of a second example, which instantiates the second embodiment described above.

Figure 9:
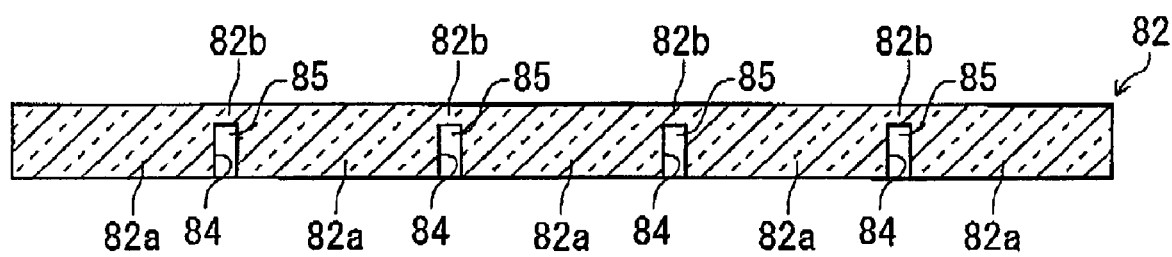
FIG. 9 is a cross-sectional view showing a light guide plate in a second example.

FIG. 9 is a cross-sectional view showing a light guide plate in a second example.

Figure 10:
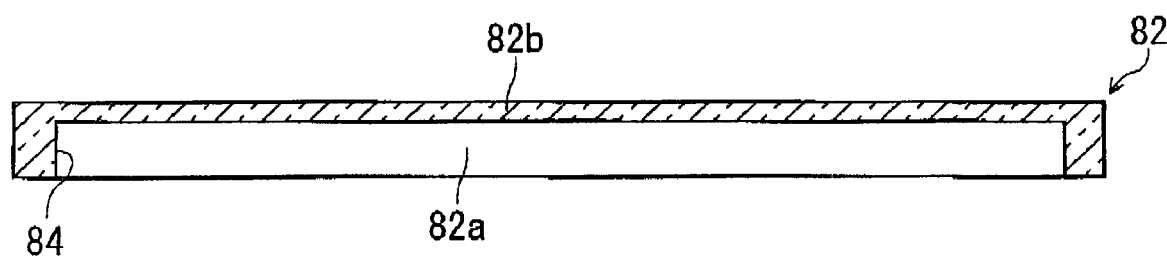
FIG. 10 is a cross-sectional view perpendicular to FIG. 9 showing this light guide plate.

FIG. 10 is a cross-sectional view perpendicular to FIG. 9 showing this light guide plate.

Here, the cross-sectional view of FIG. 9 corresponds to FIG. 7 in the first example described above. That is, it corresponds to the cross-sectional view taken along line A-A' of FIG. 6.

The illumination apparatus according to this example is different from the illumination apparatus according to the first example described above in the configuration of the light guide plate. More specifically, as shown in FIGS. 9 and 10, the light guide plate 82 of this example is monolithically formed as a rectangular plate from acrylic or other transparent resin, and a plurality of grooves 84 are formed longitudinally along the light guide plate 82 from its lower face side. The light guide plate 82 is formed illustratively by injection molding. The groove 84 has a width of 0.1 microns or more, specifically 50 microns or more. The inside of the groove 84 serves as an air layer 85. In the light guide plate 82, the portion between the grooves 84 constitutes a block 82a. The groove 84 does not run through the light guide plate 82 in its thickness direction and longitudinal direction. Hence, as shown in FIG. 10, a square U-shaped linking portion 82b is left around the groove 84 as viewed from the aligned direction of the blocks 82a. Thus the blocks 82a are not completely separated from each other, but locally, optically coupled with each other. The configuration of this example other than the foregoing is the same as that of the first example described above.

In this example, when the light injected from the light source 63 (see FIG. 6) into the block 82a reaches the side face of the block 82a, the light incident on the interface with the air layer 85 is totally reflected, but the light incident on the linking portion 82b enters an adjacent block 82a through the linking portion 82b. Thus part of the light injected into a particular block 82a from the light source 83 can be leaked into another block 82a adjacent to this particular block 82a. Thus, even if any variation in the amount of light emission of the light sources 63 causes variation in the amount of light emission between the blocks 82a, this variation can be obscured.

Furthermore, in this example, the light guide plate 82 is monolithically formed by e.g. injection molding. Hence the light guide plate 82 can be easily formed at low cost. Moreover, the rigidity of the light guide plate 82 can be ensured by the square U-shaped linking portion 82b. The operation and effect of this example other than the foregoing are the same as those of the first example described above.

In addition, in the variation of the first example described above, the spacer 72b (see FIG. 7) can be formed from transparent material to achieve the same effect as that of this example.

Next, variations of the second example are described, beginning with a first variation.

Figure 11:
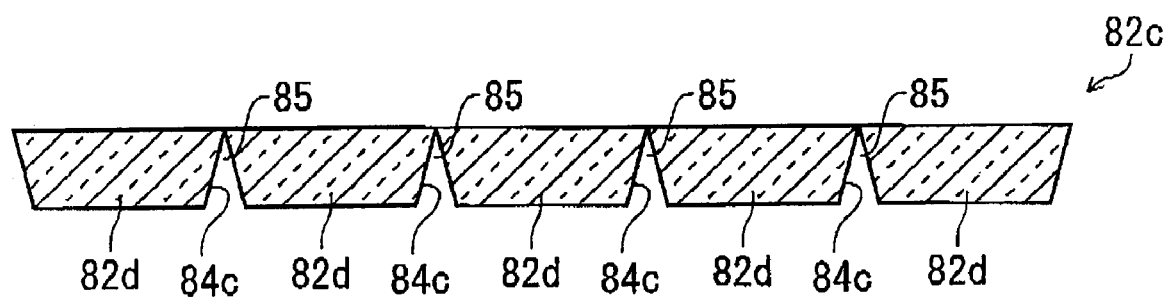
FIG. 11 is a cross-sectional view showing a light guide plate in a first variation of the second example.

FIG. 11 is a cross-sectional view showing a light guide plate in a first variation of the second example.

As shown in FIG. 11, in this variation, wedge-shaped grooves 84c are formed in the light guide plate 82c, and the light guide plate 82c is divided into a plurality of blocks 82d by these grooves 84c. Hence the cross section perpendicular to the longitudinal direction of the block 82d is shaped like a trapezoid. The taper angle of the block 82d, that is, the angle that the side face of the groove 84c makes with the normal to the surface of the light guide plate 82c, is illustratively five degrees.

The groove 84c runs through the light guide plate 82c in its longitudinal direction, but does not run through the light guide plate 82c in its thickness direction. Thus adjacent blocks 82d are locally, optically coupled with each other. According to this variation, because the block 82d is shaped like a trapezoidal prism, the light guide plate can be formed more easily by injection molding. The configuration, operation, and effect of this variation other than the foregoing are the same as those of the second example described above.

Next, a second variation of the second example is described.

Figure 12:
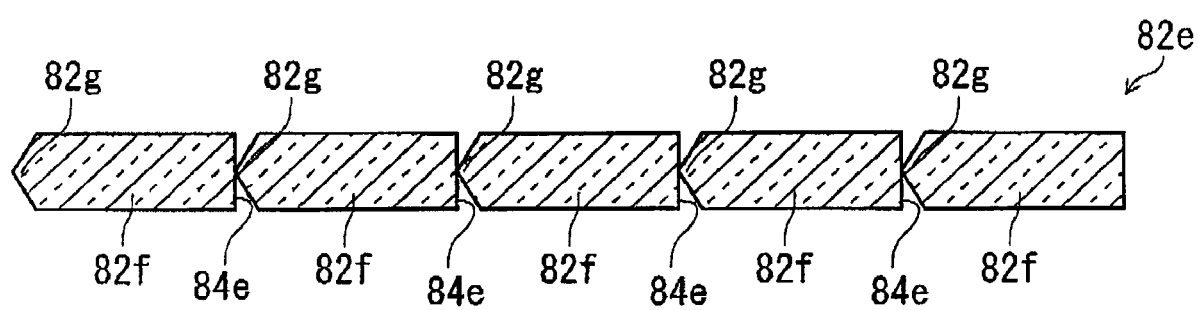
FIG. 12 is a cross-sectional view showing a light guide plate in a second variation of the second example.

FIG. 12 is a cross-sectional view showing a light guide plate in a second variation of the second example.

As shown in FIG. 12, in this variation, the light guide plate 82e is formed from a plurality of, e.g. five, blocks 82f. The plurality of blocks 82f are separate from each other. The five blocks 82f are aligned to form a light guide plate 82e so that the side faces of the blocks 82f abut each other.

A protrusion 82g is formed in one side face of each block 82f, and the other side face is flat. The protrusion 82g formed in one side face of a block 82f abuts the other side of its adjacent block 82f. That is, the protrusion 82g is formed in one of the faces opposed to each other in adjacent blocks 82f and abuts the other face. Thus a gap 84e is formed in the region between the adjacent blocks 82f other than the region that the protrusion 82g abuts. The maximum width of the gap 84e is 0.1 microns or more. The configuration, operation, and effect of this variation other than the foregoing are the same as that of the second example described above. Here the protrusion 82g may be formed in both side faces of the block 82f, and the protrusions 82g may abut each other.

Next, a third variation of the second example is described.

Figure 13:
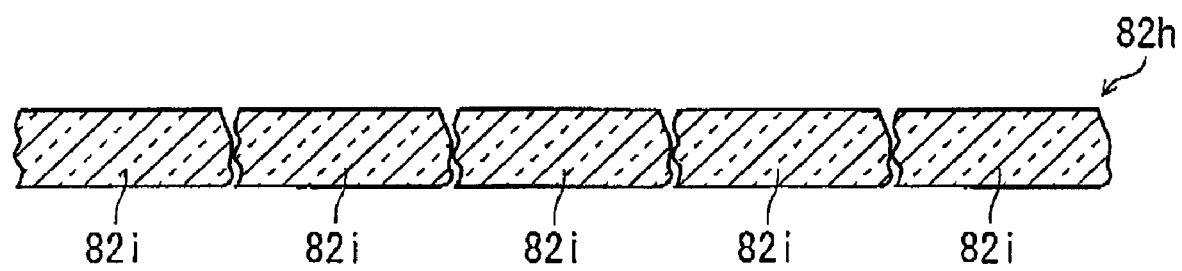
FIG. 13 is a cross-sectional view showing a light guide plate in a third variation of the second example.

FIG. 13 is a cross-sectional view showing a light guide plate in a third variation of the second example.

As shown in FIG. 13, in this variation, the light guide plate 82h is formed from a plurality of, e.g. five, blocks 82i. The plurality of blocks 82i are separate from each other. The five blocks 82i are aligned to form a light guide plate 82h so that the side faces of the blocks 82i abut each other.

The side face of each block 82i is a rough surface having irregularities with Ra (arithmetic mean roughness) being 0.1 microns or more. Thus, when the side faces of the blocks 82i abut each other, a gap of 0.1 microns or more is formed between the blocks 82i. The configuration, operation, and effect of this variation other than the foregoing are the same as those of the second example described above.

Next, a description is given of a third example, which instantiates the third embodiment (see FIG. 3) and the fourth embodiment (see FIGS. 4 and 5) described above.

Figure 14:
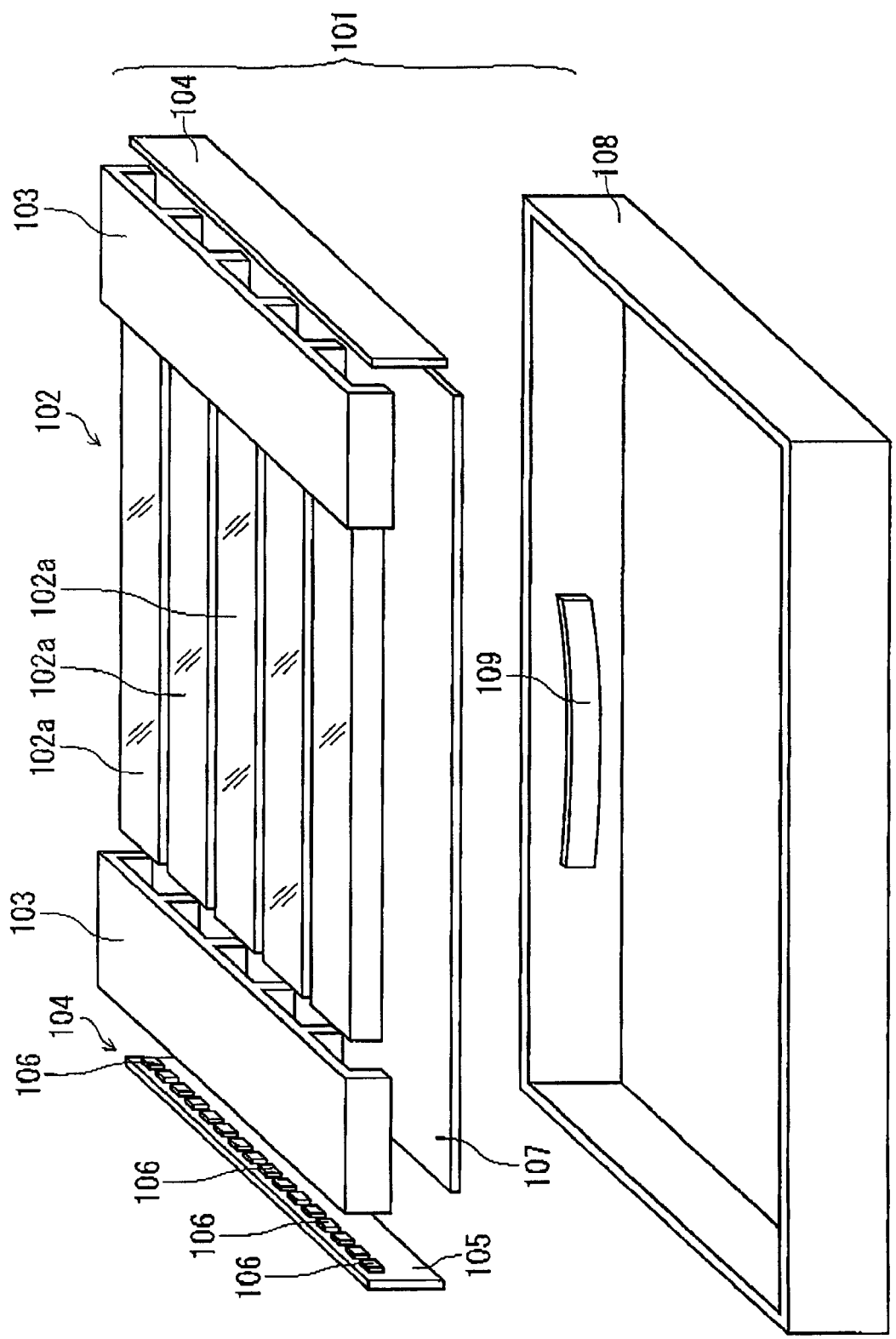
FIG. 14 is a perspective view illustrating an illumination apparatus of a liquid crystal display apparatus according to a third example.

FIG. 14 is a perspective view illustrating an illumination apparatus of a liquid crystal display apparatus according to a third example.

As shown in FIG. 14, the liquid crystal display apparatus according to this example includes an illumination apparatus 101, which has a light guide plate 102. The light guide plate 102 has the same configuration as the light guide plate 82h in the third variation of the second example described above. More specifically, the light guide plate 102 includes five blocks 102a with their side faces having irregularities of 0.1 microns or more. These blocks 102a are aligned along their widthwise direction to form a light guide plate 102. The blocks 102a abut each other, and thereby a gap of 0.1 microns or more is formed between the blocks 102a. A prism (not shown) is formed in the upper face of the block 102a, and the lower face is flat. The longitudinal direction of the block 102a coincides with the longitudinal direction of the light guide plate 102.

Hollow light guides 103 are provided as color mixing members at both longitudinally opposite ends of the light guide plate 102. Furthermore, a light source unit 104 is provided on the side of the hollow light guide 103 opposite to the light guide plate 102. That is, the light source unit 104, hollow light guide 103, light guide plate 102, hollow light guide 103, and light source unit 104 are arranged in this order along the longitudinal direction of the light guide plate 102.

A reflection sheet 107 is provided below the light guide plate 102 and the hollow light guides 103. Furthermore, a color sensor (not shown) is provided for each block 102a below the reflection sheet 107, and an opening (not shown) is formed in the portion of the reflection sheet 107 corresponding to the region directly above the color sensor. The color sensor is composed of three PDs (photodiodes) and red, green, and blue color filters interposed in the optical path of light incident on the PDs, respectively.

Each light source unit 104 includes a substrate 105 illustratively made of aluminum and having a thickness of 1.0 millimeter. Twenty LEDs 106, for example, are mounted on the surface of the substrate 105 facing the light guide plate 102. Note that FIG. 14 shows a smaller number of LEDs 106 than in reality for simplicity of the figure. The LEDs 106, including a red, green, and blue LED, is illustratively operated at 150 mA (milliamperes). For example, the twenty LEDs 106 in one light source unit 104 are grouped into five sets, each being composed of four LEDs, i.e. one red LED, two green LEDs, and one blue LED. This set corresponds to the light source 33 shown in FIG. 4 and is associated with each block 102a.

The hollow light guide 103 is shaped like a comb as viewed from the light guide plate 102 side, and partitions the space between the light source unit 104 and the light guide plate for each block 102a. The inner face of the hollow light guide, that is, the face on the side of the partitioned space, is a light reflecting surface. Thus the hollow light guide 103 and the reflection sheet 107 form a plurality of tunnels with their inner face serving as a reflecting surface. Each tunnel communicates from the set of (four) LEDs 106 of the light source unit 104 to one block 102a. The hollow light guide 103 is illustratively made of a base material formed from resin by injection molding, and the inner face of the base material is provided with mirror coating of metal film.

Furthermore, the illumination apparatus 101 includes a box-shaped housing 108 with its upper face opened. The housing 108 is illustratively formed from aluminum or resin plate. The light guide plate 102, the hollow light guides 103, the light source units 104, and the reflection sheet 107 are housed in this housing 108. A spring member 109 for biasing the blocks 102a of the light guide plate 102 to abut each other is provided on the inner face of the housing 108. The spring member 109 is illustratively a leaf spring.

An optical sheet (not shown) and a liquid crystal panel (not shown) are provided above the illumination apparatus 101. There is also a controller (not shown) for applying a video signal to the liquid crystal panel, turning on the light source units 104 in synchronization with this application timing, and controlling the output of the LEDs 106 of the light source unit 104 on the basis of the detection result of the color sensors. The controller is illustratively formed from an LSI (large scale integrated circuit).

As an example of dimensions of the liquid crystal display apparatus according to this example, the liquid crystal panel measures e.g. 9 inches, the light guide plate 102 has a thickness of e.g. 3.5 millimeters, and the hollow light guide 103 has a length of e.g. 25 millimeters in the light traveling direction, that is, in the direction from the light source unit 104 to the light guide plate 102.

Next, the operation of the liquid crystal display apparatus according to this example is described.

On the basis of an externally inputted video signal, the controller successively applies the video signal to the liquid crystal panel. In synchronization with this application timing, the LEDs 106 of the light source units 104 are successively turned on on a set by set basis.

The lights of respective colors emitted from each set of LEDs 106 are guided to one associated block 102a through the tunnel formed by the hollow light guide 103 and the reflection sheet 107. In this process, the lights of respective colors undergo color mixing. The color-mixed light enters the block 102a and propagates therein while repeating total reflection at both side faces and the upper and lower face of the block 102a. In this propagation process, the light is planarly emitted from the upper and lower face of the block 102a.

Most of the light emitted from the lower face of the block 102a is reflected from the reflection sheet 107 and returned into the block 102a. On the other hand, the light emitted from the upper face of the block 102a is diffused by the optical sheet (not shown) and transmits through the liquid crystal panel, thereby taking on an image. Then the light is emitted to the outside of the liquid crystal display apparatus 101.

Part of the light emitted from the lower face of the block 102a is detected by the color sensor. The detection result is sent to the controller. On the basis of this result, the controller controls electric power supplied to the LEDs 106.

According to this example, in synchronization with application of a video signal to the liquid crystal panel, the LEDs 106 are successively turned on on a set by set basis. Thus each pixel of the liquid crystal panel can be provided with an emission period and a non-emission period within one frame, and image display can be alternated with black display. As a result, afterimage can be reduced to eliminate blur of moving images. Furthermore, because the LEDs are turned out during black display, it is possible to enhance image contrast and to reduce power consumption. Moreover, the light guide plate 102 has no reflection plates. Hence it is possible to reduce the cost of the liquid crystal display apparatus and to enhance the utilization efficiency of light.

Furthermore, the blocks 102a of the light guide plate 102 abut each other and partially maintain optical coupling. Hence part of the light injected into a particular block 102a is leaked into another block 102a adjacent to this particular block 102a. Then, even if the amount of light emission of the LEDs 106 vary due to temperature change and aging degradation and results in varied screen brightness between the regions of the liquid crystal display apparatus, unevenness can be obscured because the boundary between the regions can be blurred.

Moreover, the light source unit 104 has red, green, and blue LED(s). Hence image display with higher color reproducibility is achieved than in the case of using white LEDs. Furthermore, by using the hollow light guide 103, color mixing of lights of respective colors emitted from the light source unit 104 can be performed in a shorter distance than in the case of color mixing of lights using the end portion of the light guide plate. As a result, the illumination apparatus 101 can be downsized.

Furthermore, the color sensor detects the amount of light emission for each block 102a, and the controller controls the output of the LEDs 106 on the basis of this detection result. Hence any variation in the output characteristics of each LED 106 due to temperature change and aging degradation can be compensated for. Thus image display free from unevenness can be achieved.

In this example, the light guide plate has the same configuration as the light guide plate 82h (see FIG. 13) in the third variation of the second example described above. However, alternatively, it is also possible to use the light guide plate in the first example or its variation, or the second example or the first or second variation thereof.

Next, a description is given of a fourth example, which also instantiates the third embodiment (see FIG. 3) and the fourth embodiment (see FIGS. 4 and 5) described above.

Figure 15:
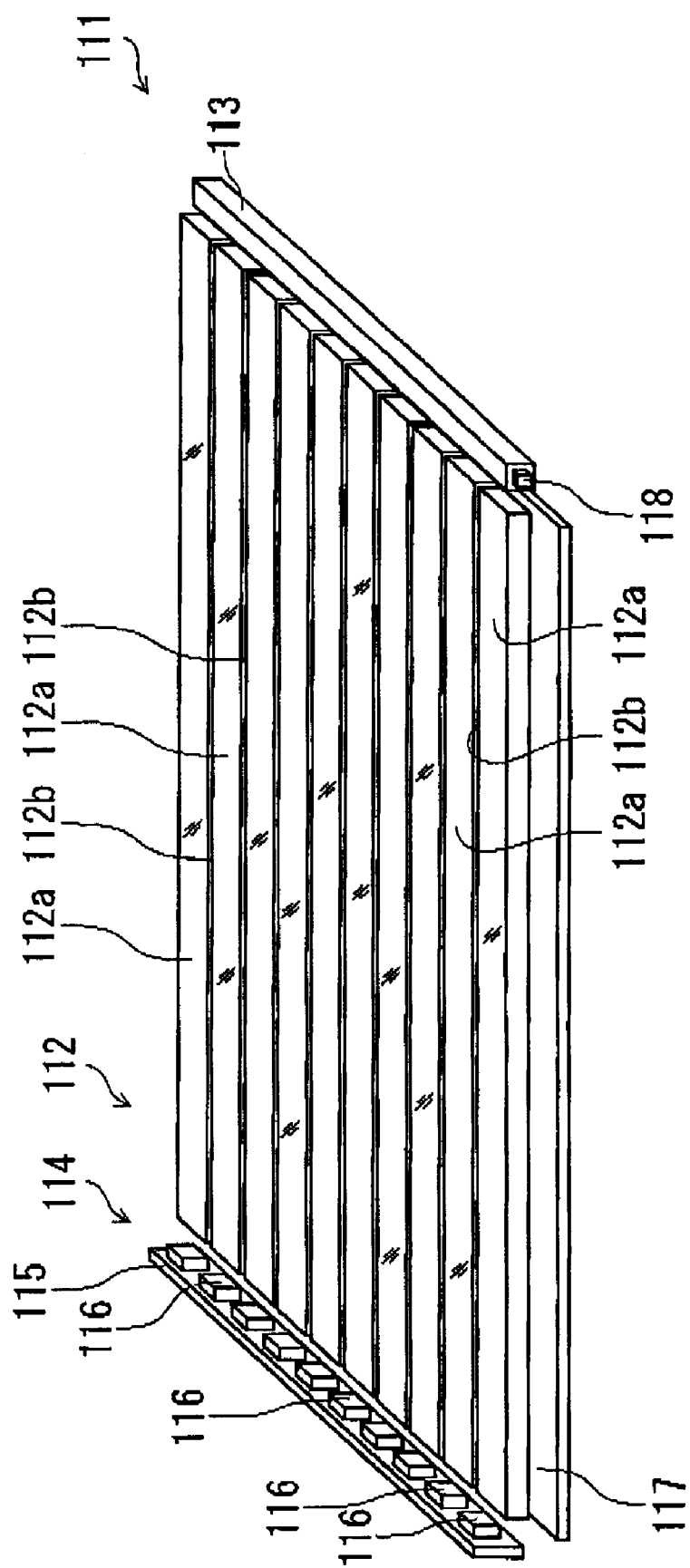
FIG. 15 is an exploded perspective view illustrating an illumination apparatus of a liquid crystal display apparatus according to a fourth example.

FIG. 15 is an exploded perspective view illustrating an illumination apparatus of a liquid crystal display apparatus according to a fourth example.

Figure 16:
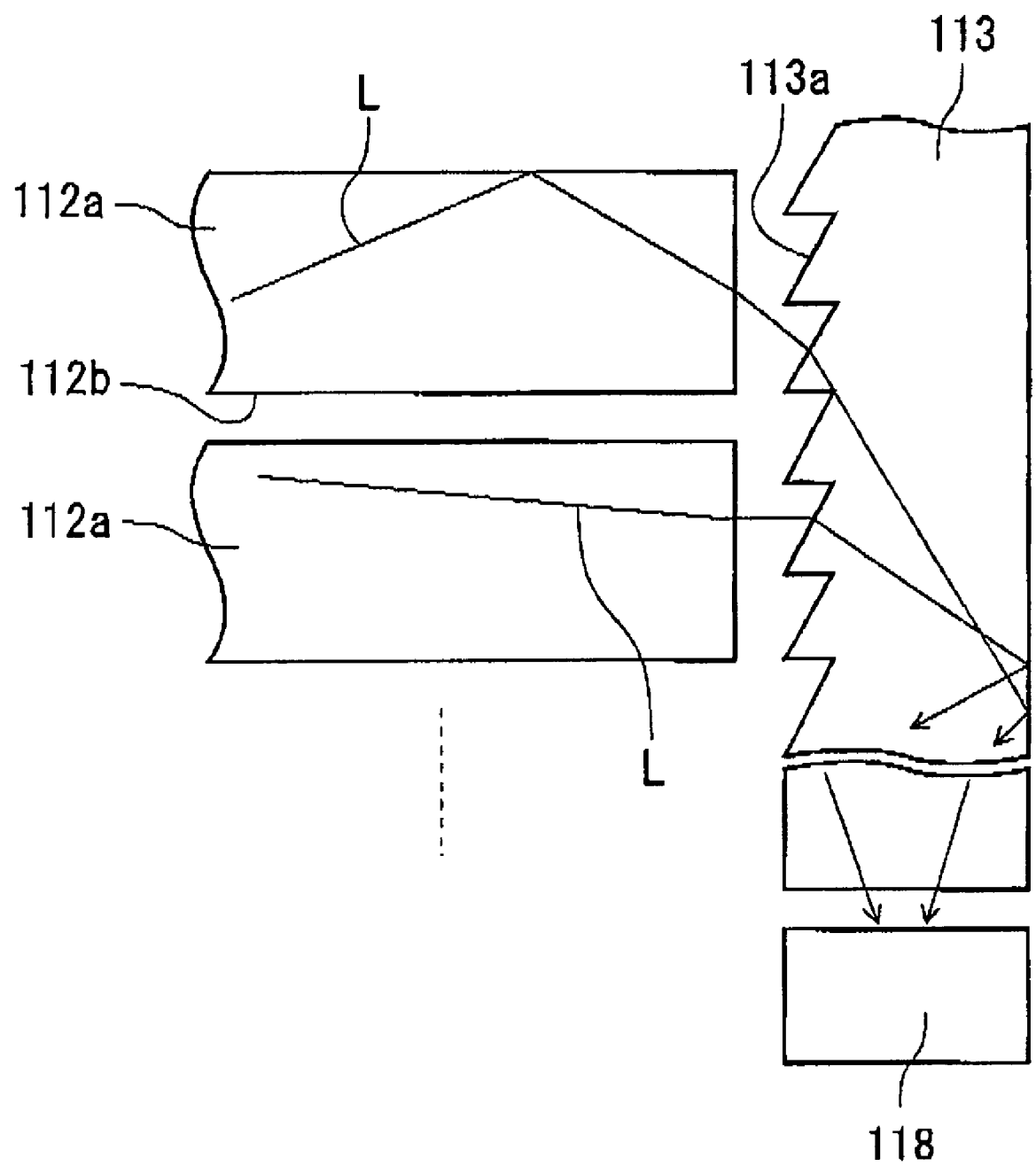
FIG. 16 is an optical model diagram showing the operation of the illumination apparatus of the fourth example.

FIG. 16 is an optical model diagram showing the operation of the illumination apparatus of the fourth example.

Figure 17:
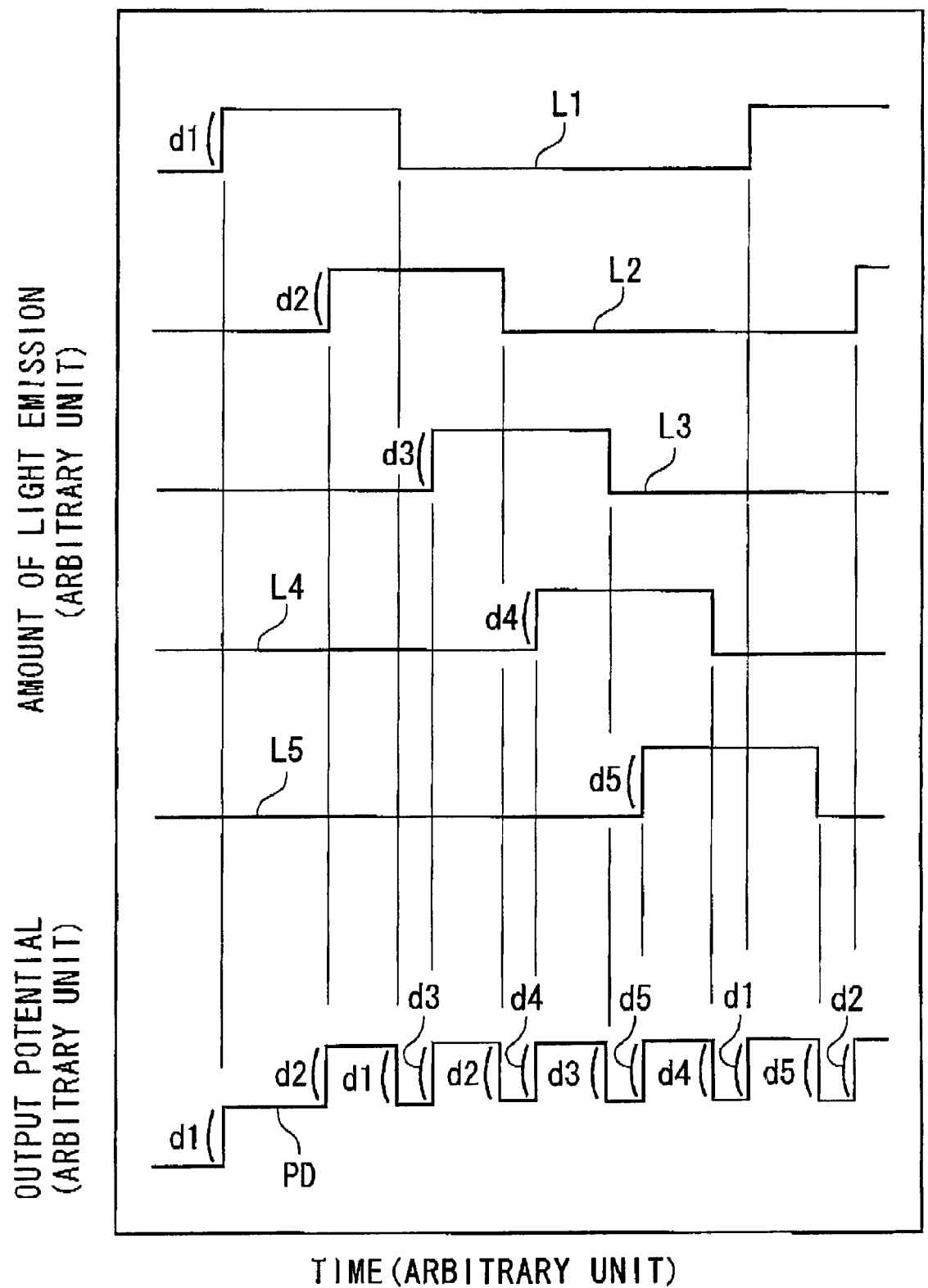
FIG. 17 is a timing chart showing the operation of the liquid crystal display apparatus according to the fourth example where the horizontal axis represents time and the vertical axis represents the amount of light emission of each block and the output potential of the light receiving element.

FIG. 17 is a timing chart showing the operation of the liquid crystal display apparatus according to the fourth example where the horizontal axis represents time and the vertical axis represents the amount of light emission of each block and the output potential of the light receiving element.

As shown in FIG. 15, the liquid crystal display apparatus according to this example includes an illumination apparatus 111, which has a light guide plate 112. The light guide plate 112 has the same configuration as the light guide plate 12 (see FIG. 2) in the second embodiment described above. More specifically, the light guide plate 112 is monolithically formed from transparent resin by injection molding, and has nine grooves 112b extending longitudinally along the light guide plate 112 and formed from its lower face side. Thus the light guide plate 112 is divided into ten blocks 112a. The groove 112b has a width of e.g. 0.1 to 1.0 millimeter, and the inside of the groove 112b serves as an air layer. The liquid crystal panel of this liquid crystal display apparatus measures e.g. 9 inches, the light guide plate 112 has a thickness of e.g. 2.0 millimeters, and the groove 112b has a depth of e.g. 1.5 millimeters. Hence the linking portion between the blocks 112a has a thickness of e.g. 0.5 millimeters.

A secondary light guide plate 113 is provided at one longitudinal end of the light guide plate 112. A light source unit 114 is provided at the other longitudinal end of the light guide plate 112. That is, the light source unit 114, the light guide plate 112, and the secondary light guide plate 113 are arranged in this order along the longitudinal direction of the light guide plate 112. The secondary light guide plate 113 is a light guide member extending in the widthwise direction of the light guide plate 112, that is, in the aligned direction of the blocks 112a, and a prism 113a (see FIG. 16) is formed in the surface of its light guide plate 112 side. Furthermore, one photodiode (PD) 118 is provided as a light receiver at one longitudinal end of the secondary light guide plate 113. The PD 118 is a visibility-corrected light receiving element. Moreover, a reflection sheet 117 is provided below the light guide plate 112.

The light source unit 114 includes a substrate 115 illustratively made of aluminum and having a thickness of 1.0 millimeter. White LEDs 116 are mounted on the surface of the substrate 115 facing the light guide plate 112. The number of white LEDs 116 is an integer multiple of the number of blocks 112a, e.g. twenty. Two white LEDs 116 are associated with one block 112a. Note that FIG. 15 shows only ten white LEDs 116 for simplicity of the figure. The white LED 116 may be replaced by a multichip package where a red, green, and blue LED are housed in one package. The configuration of this example other than the foregoing is the same as that of the third example described above.

Next, the operation of the liquid crystal display apparatus according to this example is described.

As shown in FIGS. 15 and 16, the light emitted from each white LED 116 of the light source unit 114 is injected into an associated block 112a of the light guide plate 112. Most of the light injected into the block 112a is emitted from the upper and lower face of the block 112a while propagating in the block 112a. However, part of the light reaches the end portion of the block 112a on the secondary light guide plate 113 side, is emitted from this end portion, and is injected into the secondary light guide plate 113. Part of the light injected into the secondary light guide plate 113 travels along the longitudinal direction of the secondary light guide plate 113 under the action of the prism 113a and is incident on the PD 118.

The lines L1 to L5 shown in FIG. 17 represent the amount of light emission of the consecutively arranged white LEDs 116. The line labeled "PD" represents the output intensity of the PD 118. When the white LEDs 116 are successively turned on, the output potential of the PD 118 varies accordingly. Here, if a plurality of white LEDs 116 have an overlapping turn-on period, lights from the plurality of white LEDs 116 are simultaneously incident on the PD 118, and the PD 118 has an output potential in which the potentials for the emitted light of the associated white LEDs 116 are summed. That is, as shown in FIG. 17, if the white LEDs 116 have an output intensity (lines L1 to L5) varying like rectangular pulses, the PD 118 has an output potential (line PD) varying in a sawtooth pattern. The output of each white LED 116 can be detected from the height (variation) of each step of this sawtooth line PD. In FIG. 17, the number of white LEDs 116 simultaneously turned on is illustratively one or two. However, this number depends on the operating condition of the liquid crystal panel, and is not limited to one or two. The operation of this example other than the foregoing is the same as that of the third example described above.

According to this example, the output of all the white LEDs 116 can be detected by a single PD 118. Thus the illumination apparatus 111 of this example needs only one PD 118, which simplifies wiring to the controller and signal processing in the controller. As a result, the liquid crystal display apparatus can be downsized, and its cost can be reduced. The effect of this example other than the foregoing is the same as that of the third example described above.

Next, a description is given of a fifth example.

Figure 18A:
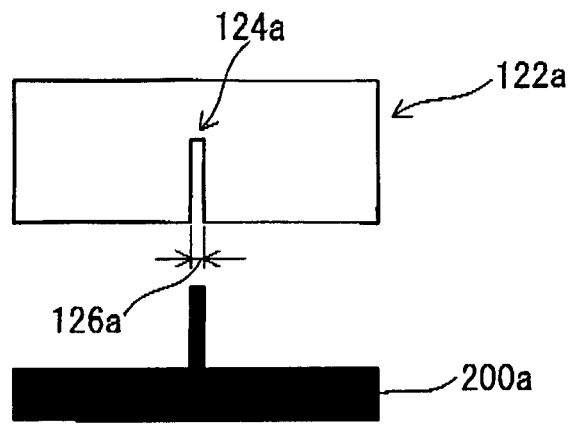
FIG. 18A is a cross-sectional view showing rectangular groove formed in a light guide plate according to a fifth example and a mold to form the groove.
Figure 18B:
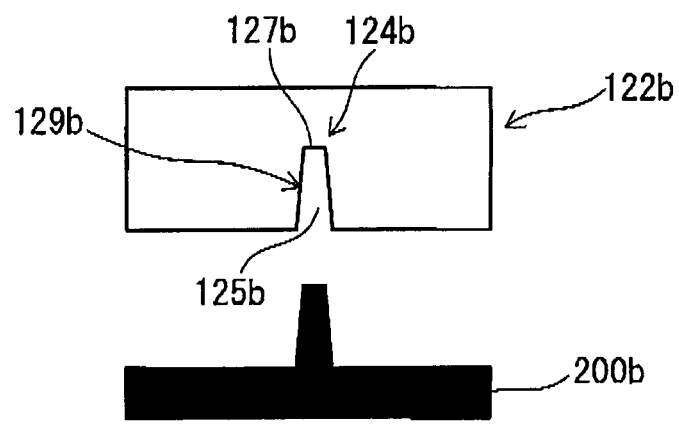
FIG. 18B is a cross-sectional view showing trapezoidal groove formed in a light guide plate according to a fifth example and a mold to form the groove.
Figure 18C:
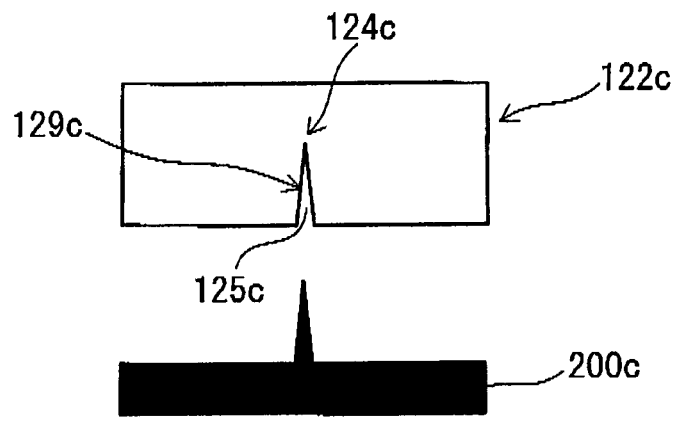
FIG. 18C is a cross-sectional view showing wedge groove formed in a light guide plate according to a fifth example and a mold to form the groove.

FIG. 18 is a cross-sectional view showing a groove formed in a light guide plate according to the example and an injection mold, FIG. 18A shows the cross-sectional view of the substantially rectangular groove and the mold, FIG. 18B shows the cross-sectional view of the trapezoidal groove and the mold, and FIG. 18C shows the cross-sectional view of the wedge-shaped groove and the mold.

Next, the shape of the groove provided in the light guide plate monolithically formed is described furthermore in detail.

Some shapes of the groove provided in the light guide plate monolithically formed cause brightness irregularity near the groove. It is conceived that the brightness irregularity can be suppressed by forming a groove 124a in substantially rectangular with an extremely shortened groove width 126a in a widthwise direction of the light guide plate, like a light guide plate 122a shown in FIG. 18A, but it is very difficult to form the groove 124a in substantially rectangular with the extremely shortened groove width 126a in the width wise direction of the light guide plate by injection molding or the like really. The reason is that a draft angle is needed in injection molding considering release characteristic of a mold 200a.

The groove provided with the draft angle includes grooves shown in FIG. 18B and FIG. 18C as an example. A groove 124b shown in FIG. 18B has a trapezoidal cross-section and a groove 124c shown in FIG. 18C has a wedge-shaped cross-section. The groove 124b has a draft angle 129b and furthermore the upper portion of the groove has a substantially flat surface 127b. The groove 124c has a draft angle 129c as well as the groove 124b. The insides of the groove 124b, 124c are air layers 125b, 125c.

In the groove 124b shaped like the substantially flat surface 127b, the brightness irregularity occasionally occur because of decrease of the brightness directly above the groove. This is because the light from the light source (not shown) is reflected by the substantially flat surface 127b and an amount of the light emitted to the upper face of the light guide plate decreases. Therefore, it is preferred to provide the drafted angle and furthermore a shape which the substantially flat surface in the upper part of the groove is removed, that is, the wedge-shaped groove 124c shown in FIG. 18C.

Figure 19:
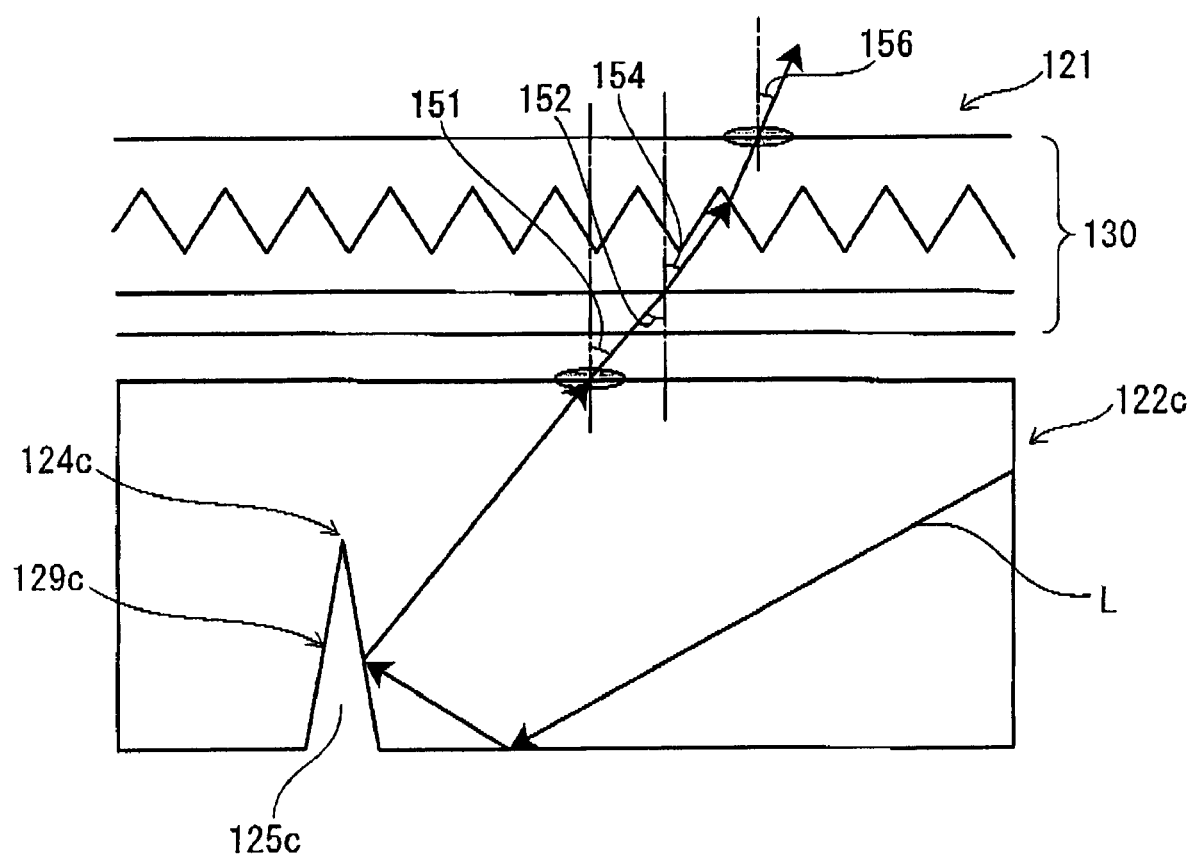
FIG. 19 is a schematic view illustrating an illumination apparatus showing a mechanism of generating of bright lines which can be a cause of uneven brightness.

FIG. 19 is a schematic view of the illumination apparatus illustrating occurrence mechanism of a bright line (luminescent line) causing the brightness irregularity. Here, the occurrence mechanism of the bright line (luminescent line) is described in detail taking a wedge-shaped groove provided in the light guide plate as an example.

As shown in FIG. 19, an illumination apparatus 121 is provided with a light guide plate 122c and an optical sheet 130. The wedge-shaped groove 124c is formed in the light guide plate 122c. The wedge-shaped groove 124c has the inclined surface (drafted angle). The inside of the wedge-shaped groove 124c is the air layer 125c. The optical sheet 130 has, for example, a prism sheet and a diffusion sheet.

When the light source 3 (See FIG. 1) emits light, the light enters the light guide plate 122c from an end face of the light guide plate 122c, is totally reflected at the surface of the light guide plate 122c, that is, at the face constituting the side face of the light guide plate 122c or the interface between the inclined surface 129c and the air layer 125c and at the upper and lower face of the light guide plate 122c, and propagates in the light guide plate 122c away from the light source 3. In FIG. 19, the propagation path of the light is illustrated as an optical path L. The optical path L is depicted in schematic form as a typical bright line among infinite number of optical paths. In this propagation process, the light is scattered at the interface between the inclined surface 129c and the air layer 125c. The light that has resulted in violating the total reflection condition at the upper face of the light guide plate 122c is emitted at an emitted angle 151 toward the optical sheet 130 from the upper face of the light guide plate 122c. The light incident on the optical sheet 130 at an incident angle 152 being substantially the same as the emitted angle 151 enters the optical sheet 130, is refracted at an refracted angle 154 by the lower face of the prism sheet or the like, furthermore refracted by the upper face of the prism sheet or the like and is emitted at an emitted angle 156. The emitted angle 156 is smaller than the emitted angle 151.

In this manner, the light scattered at the interface between the inclined surface 129c and the air layer 125c is emitted toward the upper face of the optical sheet and resulted in being seen as the bright line (luminescent line). Therefore, in close to the groove provided in the light guide plate, a visible portion as the bright line (luminescent line) and an invisible portion (dark line) as the bright line result in existing, then the bright irregularity becomes to occur.

The function of the optical sheet is described.

If the optical sheet does not exist, the light emitted from the light guide plate has a brightness distribution that the brightness in slanted direction to the surface of the light guide plate is larger than the brightness in the substantially perpendicular direction to the surface of the light guide plate. That is, the more brightness can be obtained in viewing the liquid crystal display apparatus from the oblique direction to the liquid crystal panel surface than in viewing the liquid crystal display apparatus from the substantially perpendicular direction to the liquid crystal panel surface.

However, generally viewing the liquid crystal display apparatus from the substantially perpendicular direction to the liquid crystal panel surface is much more often than viewing the liquid crystal display apparatus from the oblique direction to the liquid crystal panel surface, therefore, it is needless to say that the brightness in the substantially perpendicular direction to the liquid crystal panel surface is preferable to be larger. If the optical sheet is arranged between the light guide plate and the liquid crystal panel, the light emitted from the light guide plate is refracted by the prism sheet or the like having the optical sheet, then the distribution of the brightness becomes larger in the substantially perpendicular direction to the light guide plate surface than in the oblique direction to the light guide plate surface. That is to say, the optical sheet has the function of enlarging the brightness distribution of the light emitted from the light guide plate in the substantially perpendicular direction to the light guide plate surface. Therefore, the optical sheet is an important component in the illumination apparatus and is to be an essential component.

The arrangement of the optical sheet causes the bright line (luminescent line) previously described to approach toward the substantially perpendicular direction to the light guide plate surface, in comparison with no arrangement of the optical sheet. This is not desirable to performance of the liquid crystal display apparatus. Then, it is necessary to suppress the brightness irregularity occurring close to the groove provided in the light guide plate. Since the inventor found a condition for the shape of the groove available to suppress the brightness irregularity, the condition is described in detail hereinafter.

Figure 20:
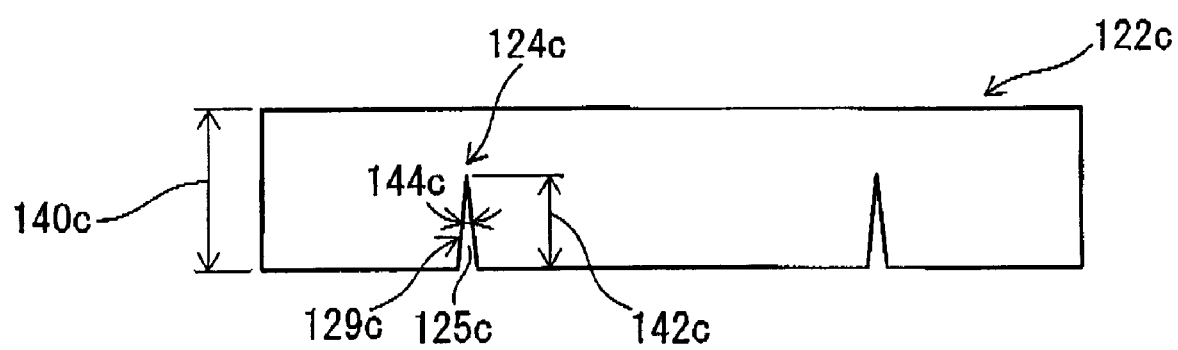
FIG. 20 is a cross-sectional view showing grooves of a light guide plate according to a fifth example.

FIG. 20 is a cross-sectional view showing a groove of the light guide plate in the example.

The light guide plate 122c shown in FIG. 20 is provided with the wedge-shaped groove 124c as well as the light guide plate shown in FIG. 18, FIG. 19. The wedge-shaped groove 124c has the inclined surface (drafted angle) 129c. The inside of the groove 124c is to be the air layer 125c. In FIG. 20, a thickness 140c of the light guide plate shows a distance between the upper face and the lower face of the light guide plate. An apex angle 144c of the wedge-shaped groove 124c shows an angle forming a vertex of the wedge, and a groove depth 142c shows a distance from the lower face of the light guide plate 122c to the vertex of the wedge-shaped groove 124c.

As the apex angle 144c becomes smaller in the light guide plate 122c shown in FIG. 20, that is, the inclined surface 129c approaches toward the substantially perpendicular direction to the light guide plate surface, the light (bright line) scattered at the interface between the inclined surface 129c and the air layer 125c results in being emitted from the light guide plate with a large emitting angle 151 (See FIG. 19). Associating with this, the light is also emitted from the optical sheet 130 (See FIG. 19) with a large emitted angle 156.

If the emitted angle 156 becomes 30 degrees or more, the light comes to be almost invisible to eyes of a person viewing the liquid crystal display apparatus and a practical problem in use disappears. It is understood from a prior examination by the inventor that the apex angle 144c of the wedge-shaped groove 124c is needed to be 15 degrees or less so that the emitted angle 156 becomes 30 degrees or more.

Therefore, a condition for the shape of the groove for suppression of the brightness irregularity occurring close to the groove provided in the light guide plate includes that the apex angle 144c is 15 degrees or less, as the first condition.

As described previously, the brightness irregularity occurring close to the groove provided in the light guide plate is caused by the light scattered at the interface between the inclined surface 129c and the air layer 125c. Therefore, the condition for suppression of the brightness irregularity also includes suppression of scattering at the interface between the inclined surface 129c and the air layer 125c as the other condition. Reducing the surface roughness of the inclined surface 129c allows the scattering to be suppressed.

As the depth 142c of the wedge-shaped groove 124c becomes deeper with respect to the thickness 140c of the light guide plate 122c, that is, the thickness of the portion connected with an adjacent block each other at the upper portion of the light guide plate 122c becomes thinner, the brightness goes lower directly above the groove 124c and the dark line occasionally appears. The dark line causes the brightness irregularity. The dark line is allowed to be suppressed by making the depth 142c of the wedge-shaped groove 124c shallow with respect to the thickness 140c of the light guide plate 122c.

If a relational expression between the depth 142c of the wedge-shaped groove 124c and the thickness 140c of the light guide plate 122c satisfies (depth of wedge-shaped groove/thickness of light guide plate)$\leq 0.7$, the dark line turns hard to be visible to eyes of a person viewing the liquid crystal display apparatus from the front. Moreover, a contrast of the bright line goes lower by birefringence phase difference during passing through a liquid crystal cell obliquely, also in viewing the liquid crystal display apparatus at an angle. Therefore, the brightness irregularity can be suppressed close to the wedge-shaped groove 124c.

On the other hands as the depth of the wedge-shaped groove 124c becomes shallower with respect to the thickness 140c of the light guide plate 122c, that is, the thickness of the portion connected with the adjacent block each other becomes thicker at the upper portion of the light guide plate 122c, pseudo-impulse type display is occasionally impossible. This is allowed to be suppressed by making the depth 142c of the wedge-shaped groove 124c deep with respect to the thickness 140c of the light guide plate 122c.

If a relational expression between the depth 142c of the wedge-shaped groove 124c and the thickness 140c of the light guide plate 122c satisfies (depth of wedge-shaped groove/thickness of light guide plate)≧0.4, light leak to the adjacent block can be suppressed, then impulse response comes to be possible. Moreover, since a projected area of the groove 124c to the emitted face of the light guide plate 122c becomes smaller, the suppression of the contrast of the bright line also comes to be possible. Therefore, the brightness irregularity can be suppressed close to the wedge-shaped groove 124c.

Consequently, a condition for the shape of the groove for suppression of the brightness irregularity occurring close to the groove provided in the light guide plate includes that the relational expression between the depth 142c of the wedge-shaped groove 124c and the thickness 140c of the light guide plate 122c satisfies 0.4≦(depth of wedge-shaped groove/thickness of light guide plate)≦0.7, as the second condition.

The conditions for the shape of the groove which is possible to be manufactured and to suppress the brightness irregularity have been described with reference to the fifth example.

In summary, conditions are as follows:
The first condition;
  The angle forming the vertex of the wedge-shaped groove is 15 degrees or less.
The second condition;
  The relational expression: 0.4≦(depth of wedge-shaped groove/thickness of light guide plate)≦0.7 is satisfied.

The invention has been described with reference to the embodiments and the associated examples and variations. However, the invention is not limited to these embodiments, examples, and variations. For example, the above embodiments, examples, and variations may be combined with each other as long as technically feasible. Any illumination apparatuses or liquid crystal display apparatuses according to the above embodiments, examples, variations, or combinations thereof that are variously adapted by those skilled in the art are also encompassed within the scope of the invention as long as they include the features of the invention. For example, the liquid crystal panel and the optical system of the liquid crystal display apparatus can be appropriately selected depending on the size and performance required for the liquid crystal display apparatus. In the third example described above, the light receiver is illustratively placed below the light guide plate, and in the fourth example, the light receiver is illustratively placed on the downstream side of the light guide plate. However, the placement of the light receiver is not limited thereto, but the light receiver may be placed on the upstream side of the light guide plate, for example.

The invention claimed is:

1. An illumination apparatus comprising:
   a light guide plate composed of a plurality of aligned blocks; and
   a plurality of light sources, each being provided for one of the blocks and emitting light to the one block,
   the light guide plate being monolithically formed, and being divided into the plurality of aligned blocks by wedge-shaped grooves which are formed in the light guide plate, and are substantially parallel to a direction of the light,
   a gap of 0.1 microns or more being formed in a part of a region between the adjacent blocks by forming the grooves, and
   an inside of the gap serving as an air layer;
   an apex angle of the wedge-shaped groove is 15 degrees or less, and
   a ratio (depth of the wedge-shaped groove/thickness of the light guide plate) is in a range from 0.4 to 0.7.

2. The illumination apparatus according to claim 1, wherein a width of the gap is greater than a wavelength of a light emitted from the light sources.

3. The illumination apparatus according to claim 1, wherein the plurality of blocks are separate from each other, the adjacent blocks have faces opposed to each other, at least one of the faces is a rough surface having irregularities with Ra being 0.1 microns or more, and the one face abuts the other of the faces opposed to each other, whereby the gap of 0.1 microns or more is formed.

4. The illumination apparatus according to claim 1, wherein the plurality of blocks are separate from each other, and a spacer is provided between the blocks, whereby the gap of 0.1 microns or more is formed.

5. The illumination apparatus according to claim 1, wherein the light guide plate is formed by an injection molding.

6. The illumination apparatus according to claim 1, wherein
   the plurality of aligned blocks are separate,
   a protrusion is formed in one of faces opposed to each other in adjacent blocks and abuts other face,
   a gap is formed in a region between the adjacent blocks other than a region that the protrusion abuts, and
   a maximum width of the gap is 0.1 microns or more.

7. The illumination apparatus according to claim 1, wherein
   each of the light sources includes a red light emitting diode configured to emit red light, green light emitting diode configured to emit green light, and a blue light emitting diode configured to emit blue light.

8. The illumination apparatus according to claim 7, further comprising a color mixing member provided between the block and its associated light sources, the color mixing member mixing the red light, the green light and the blue light.

9. A liquid crystal display apparatus comprising:
   an illumination apparatus;
   a liquid crystal panel irradiated with light from the illumination apparatus; and
   a controller for applying a video signal to the liquid crystal panel and successively turning on the light sources in synchronization with timing of application of the video signal,
   the illumination apparatus including:
      a light guide plate composed of a plurality of aligned blocks; and
      a plurality of light sources, each being provided for one of the blocks and emitting light to the one block,
      the light guide plate being monolithically formed, and being divided into the plurality of aligned blocks by wedge-shaped grooves which are formed in the light guide plate substantially parallel to the direction of the light,
      a gap of 0.1 microns or more being formed in a part of a region between the adjacent blocks by forming the grooves, and
   an inside of the gap serving as an air layer;
      an apex angle of the wedge-shaped groove is 15 degrees or less, and
      a ratio (depth of the wedge-shaped groove/thickness of the light guide plate) is in a range from 0.4 to 0.7.

10. The liquid crystal display according to claim 9, wherein a width of the gap is greater than a wavelength of a light emitted from the light sources.

11. The liquid crystal display according to claim 9, wherein the plurality of blocks are separate from each other, the adjacent blocks have faces opposed to each other, at least one of the faces is a rough surface having irregularities with Ra being 0.1 microns or more, and the one face abuts the other of the faces opposed to each other, whereby the gap of 0.1 microns or more is formed.

12. The liquid crystal display according to claim 9, wherein the plurality of blocks are separate from each other, and a spacer is provided between the blocks, whereby the gap of 0.1 microns or more is formed.

13. The liquid crystal display according to claim 9, wherein the light guide plate is formed by an injection molding.

14. The liquid crystal display according to claim 9, wherein
the plurality of aligned blocks are separate,
a protrusion is formed in one of faces opposed to each other in adjacent blocks and abuts other face,
a gap is formed in a region between the adjacent blocks other than a region that the protrusion abuts, and
a maximum width of the gap is 0.1 microns or more.

15. The liquid crystal display according to claim 9, wherein
each of the light sources includes a red light emitting diode configured to emit red light, green light emitting diode configured to emit green light, and a blue light emitting diode configured to emit blue light,
the liquid crystal display further comprising a color mixing member provided between the block and its associated light sources, the color mixing member mixing the red light, the green light and the blue light.

16. The liquid crystal display apparatus according to claim 9, wherein
the illumination apparatus further includes a light receiver for detecting intensity of the light for each block, and
the controller controls the light sources using a detection result of the light receiver.

* * * * *